Nov. 20, 1956  L. H. FREEDMAN  2,771,597
SPEED WARNING

Filed Dec. 1, 1955  2 Sheets-Sheet 1

LOUIS H. FREEDMAN
INVENTOR.

BY *Herbert J. Brown*

ATTORNEY

Nov. 20, 1956

L. H. FREEDMAN 2,771,597

SPEED WARNING

Filed Dec. 1, 1955

LOUIS H. FREEDMAN
INVENTOR.

BY Herbert J. Brown

ATTORNEY

United States Patent Office 2,771,597
Patented Nov. 20, 1956

2,771,597

SPEED WARNING

Louis H. Freedman, Fort Worth, Tex.

Application December 1, 1955, Serial No. 550,333

6 Claims. (Cl. 340—266)

This invention relates to speedometers and has reference to an audible and/or visible alarm for warning the driver of an automobile or other vehicle of approaching or reaching selected maximum or minimum speeds.

In recent years, manufacturers of automobiles have generally followed a trend of equipping their products with larger and more powerful engines than had previously been used. This trend plus engineering developments improving sound suppression and chassis suspension has resulted in comfortable vehicles which are capable of relatively high speeds, thus giving the driver a false sense of security. Many accidents have resulted because drivers have proceeded to increase their speed without being aware, in the complacency of their comfort, that their vehicles have reached dangerous velocities. Until such a time that the possibility of mechanical failures has been eliminated, and until hazardous zones such as traffic intersections have been eliminated from our road system, the unconscious acceleration to dangerous speeds will constitute a danger to those who use roads and highways. In addition to the dangers which accompany excessive speed, legal speed limits are in force in most areas of the country; a driver who unintentionally exceeds these limits is subject to monetary penalties. Conversely, minimum speeds are enforced in some areas, such as on pikes and freeways, and it would be advantageous to warn a driver of approaching or reaching the minimum speed enforced. Similarly, for motorists who travel long distances, and especially for those who do so at night, there is a converse danger in unwarned deceleration. Driving for long hours may produce fatigue which in turn may produce sleep which in generally accompanied by muscular relaxation. An audible or visible warning system which indicates that speed has been reduced to a preset level may be used to arouse weary drivers and thereby prevent accidents.

An object of the present invention is to provide an audible and/or visible alarm to warm drivers that a predetermined level of speed has been reached.

Another object of the invention is to provide a speed alarm for automobiles which may be powered directly by the battery of an automobile and which requires no auxiliary power or power amplification system.

A further object of the invention is to provide a speed alarm for automobiles which may be actuated by the speedometer of an automobile but which does not impair the speedometer's accuracy.

A particular object of the invention is to provide a speed alarm for automobiles which warns of either the attainment of maximum or minimum desired speed levels according to the manner of its use.

An important object of the present invention is to provide a speed alarm for automobiles which is adaptable for attachment to presently existing speedometers.

Another object of the invention is to provide a manual reset mechanism for an automotive speed alarm which requires a driver to make a conscious action to eliminate an audible and/or visible warning.

An additional object of the invention is to provide a speed alarm for automobiles and wherein failure or disconnection of the alarm system does not impair the efficiency or accuracy of the automobile's speedometer.

These and other objects will become apparent from the following description and the accompanying drawings, wherein.

Figure 1:
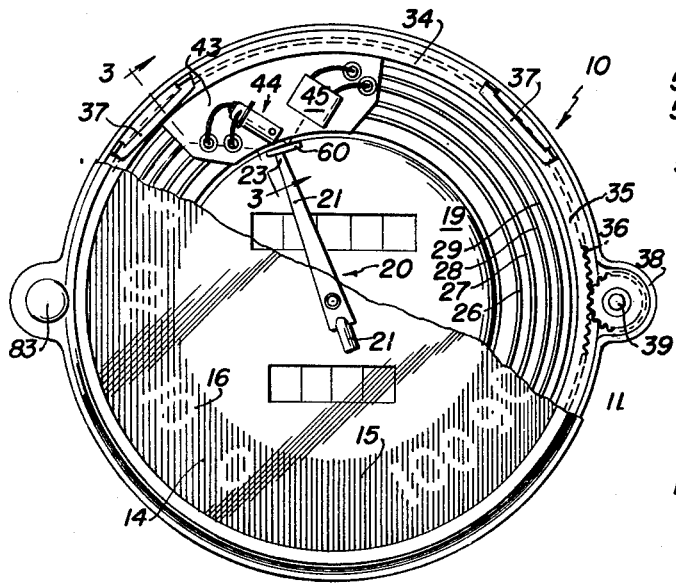
Figure 1 is a front elevational view of a speedometer equipped with a speed alarm and shown with a portion of the dial facing removed to illustrate the relative positions of various components.
Figure 2:
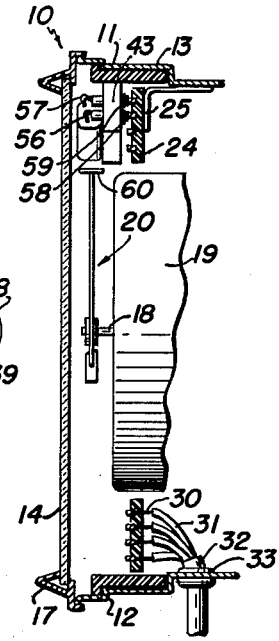
Figure 2 is a broken side elevational and sectional view of a speedometer equipped with a speed alarm.
Figure 3:
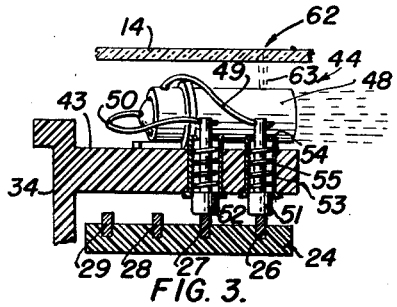
Figure 3 is an enlarged sectional view taken approximately along line 3—3 in Figure 1.
Figure 5:
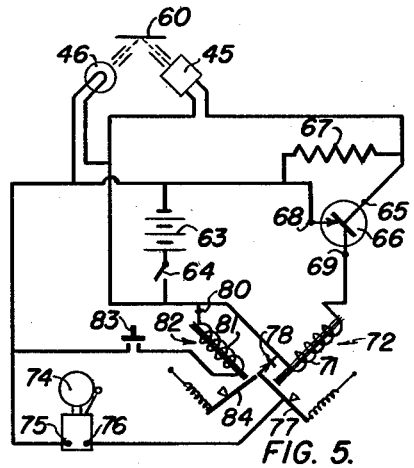
Figure 5 is a schematic diagram of electrical circuits and components embodied in a preferred form of the present invention.
Figure 4:
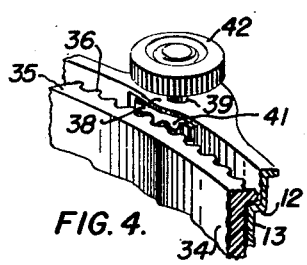
Figure 4 is a fragmentary perspective view of the adjustment mechanism of a speed alarm as described herein.
Figure 6:
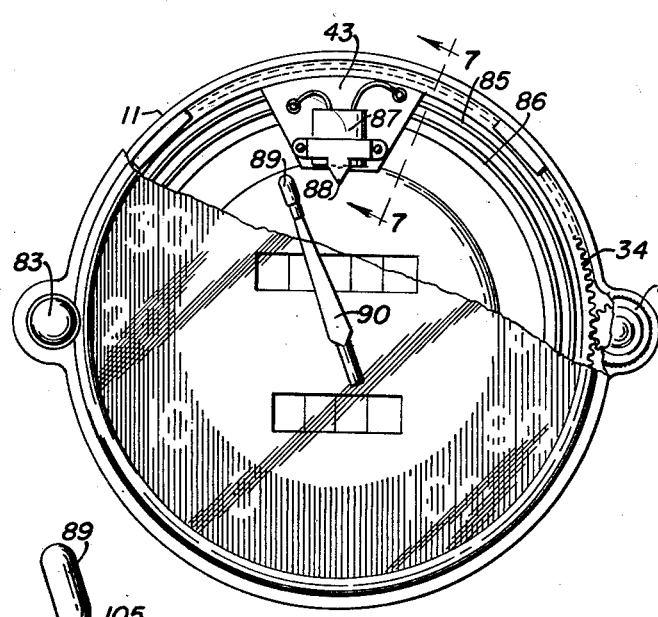
Figure 6 is a front elevational view of a speedometer equipped with an alternate form of the invention and shown with a portion of the dial facing removed to illustrate internal features of construction.
Figure 7:
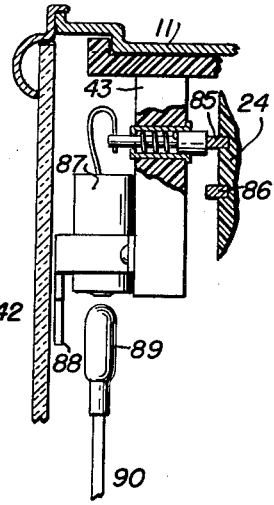
Figure 7 is a fragmentary sectional and broken elevational view of an alternate construction of the speed alarm shown in Figure 6.

In the drawings, a speedometer 10 is shown conventionally mounted within a circular case 11. A shoulder 12 is formed in the cylindrical sides 13 of the case 11 so that the diameter of the case is larger at the front of the case than at the rear. A circular dial facing 14 made of transparent material such as glass is coated with translucent paint 15 at the perimeter of its rear surface in accordance with typical speedometer construction. Areas, forming calibrated indicia 16, are left uncoated at the outer perimeter of the rear surface of the dial facing 14. An annular dial bracket 17 is formed to secure the circumference of the dial facing 14 and is inwardly flanged for attachment to the cylindrical sides 13 at the front of the speedometer case 11. A shaft 18 is positioned within the case 11 and is disposed perpendicularly to the dial facing 14 which is in axial alignment with the center thereof. The shaft 18 is driven by the usual speedometer driving mechanism 19 which is mounted within the case 11 and which normally occupies approximately one-half of the case 11. A pointer arm 20 is perpendicularly attached to the outer end of the shaft 18 in a plane of rotation parallel to the dial facing 14. As usually constructed (and as illustrated) the weight of the pointer arm 20 is equally distributed between portions of the arm extending oppositely from the shaft 16. One end 21 of the pointer arm 20 is longer than the other end 22 and terminates in a tip 23, and the arm 20 is generally wedge-shaped with the shorter and wider end 22 opposite the tip 23. Since the driving mechanism is weight sensitive, unequal weight distribution of the arm impairs the accuracy of the speedometer and it is noted that alteration of a conventional pointer arm must account or compensate for changes in weight distribution.

An annular plate 24 made of electrical insulating material such as fiber board is positioned within the case 11 in a plane parallel with the dial facing 14. The inner diameter of the annular plate 24 is larger than the diameter of the driving mechanism 19, and the outer diameter of the annular plate 24 is less than the inner diameter of the speedometer case 11 so that the annular plate 24 may be accommodated in the space between the driving mechanism 19 and the sides 13 of the case 11. L-shaped brackets 25 are attached at intervals about the interior of the case 11 and are each attached to the rear surface of the annular plate 24. Four circular slip rings 26, 27, 28 and 29, made of copper or other suitable electrical conducting material, are concentrically attached to the forward side of the annular plate 24. Each slip ring 26, 27, 28 and 29 is of a different diameter with respect to the other slip rings and each is embedded within a corresponding groove in the forward surface of the annular plate 24 so that the slip rings are regularly spaced from one another in a common plane. An opening is provided through the annular plate 24 behind each slip ring 26, 27, 28 and 29 and electrically conducting lines 30 are separately attached to the rear surface of each slip ring from which lines 30 extend rearwardly of the annular plate 24. Each line 30 is provided with a covering 31 of electrical insulating material and the covered lines are gathered within a common covering to form a cable 32 through which they extend to the exterior of the case 11; a hole is provided through the wall of the case to accommodate the cable 32, and a grommet 33 is provided within the hole to prevent frictional damage to the cable.

A rotatable cylinder 34 is positioned within the case 11 and is coaxially disposed with the shaft 18. The outer surface of the rotatable cylinder 34 is adjacent the inner surface of the circular case 11 and the forward edge of the rotatable cylinder 34 extends forwardly beyond the case shoulder 12. The forward edge of the rotatable cylinder 34 is outwardly directed to form an annular flange 35 which is provided with gear teeth 36. A gear housing 38, integral with the case 11, is attached to one side of the case 11 and a gear shaft 39 parallel with the speedometer shaft 18 extends forwardly therefrom. A gear 40, with teeth 41 corresponding to the teeth 36 on the outer edge of the lip 35 of the rotatable cylinder 34, is positioned within the gear housing 38 and is attached to the gear shaft 39 in a plane of rotation perpendicular to the shaft, and an adjustment knob 42 is attached to the forwardly extending end of the shaft 39 to provide convenient means for rotating the cylinder 34. A mounting plate 43 is attached to the inner surface of the rotatable cylinder 34 and extends inwardly therefrom over a segment of the annular plate 34 in a position parallel with the annular plate 34. Attached to the forward surface of the mounting plate 43 there are a light source 44 and a photosensitive electronic cell 45. The light source 44 comprises an electric light bulb 46, a suitable socket for the light bulb 47, and a metal shield 48 extending from the socket to a point beyond the end of the light bulb 46. Electrical conductors 49 and 50 from the light bulb 46 extend from the socket 47 to brushes 51 and 52 which respectively make contact with the inner slip rings 26 and 27 on the annular plate 24. Each brush 51 and 52 is movably mounted within a brush holder 53 extending through the mounting plate 24, and brush terminals 54 project through corresponding openings in the forward end of theh brush holders 53 on the forward side of the mounting plate 43. A helical spring 55 is positioned within each brush holder 53 about the terminal 54 therein and exerts tension against the brushes 51 and 52 to maintain contact between the brushes 51 and 52 and an adjacent slip ring 26 and 27. A photosensitive electronic cell 45 is also attached to the forward side of the mounting plate 43. While any of a number of commercially available photosensitive electronic devices may be used in conjunction with the invention, phototransistors of the germanium grown junction n—p—n type have been found especially suitable because of their small size, low current drain, low voltage requirements, and their inherent directional sensitivity. Electrical conductors 56 and 57 extend from the photosensitive cell 45 to brushes 58 and 59, each of which makes contact with one of the slip rings 28 and 29 on the annular plate 24. The brushes 58 and 59, in contact with the electronic cell 45, are made and mounted in accordance with the described construction of the brushes 51 and 52 electrically connected to the light bulb 46. A photoreflective plate 60 is attached to the point 23 of the pointer arm 20 with the reflective plate 60 perpendicular to the radial axis of the pointer arm 20. The plate 20 may be a glass mirror, polished metal or the plate 20 may be constructed as an integral part of the pointer arm 20 by coating a suitably disposed flat area on the tip 23 of the longer end 21 of the arm 20 with a reflective paint. It is noted that the weight of paint or a small plate of metal foil is generally negligible with respect to the weight of the pointer arm 20; when reflective plates of appreciable weight are used, counterweights (not shown) are attached to the shorter end 21 of the pointer arm 20 to maintain proper weight distribution. The light source 44 and photosensitive cell 45 are positioned upon the mounting plate 43 so that no light is directly incident upon the photosensitive cell 45; similarly, the reflective plate 60 is positioned upon the pointer arm 20 so that light from the light source 44 will strike the plate 60 at some point of the rotation of the pointer arm 20, and that light will be reflected from the plate 60 into the photosensitive cell 45. It is well known that the angle of reflection from a flat surface equals the angle of optical incidence; it will be seen, therefore, that the light directing and receiving components of the light source 44 and photosensitive cell 45, respectively, form equal angles with the plane of the reflective plate 60.

A small opening 61 is provided through the forward side of the shield 48. A relatively narrow beam of light is thus emitted forwardly of the shield 48 when the bulb 46 is illuminated, and the beam of light is incident upon the translucent coating 15 about the perimeter of the dial facing 14. An illuminated dot 62 formed on the dial facing by the opening in the shield serves as a marker to indicate the position of the optical components with respect to the indicia 16 on the dial facing 14. In place of the small opening 61 a separate small light bulb, not shown, may be mounted on the mounting plate 43 for indicating the relative position of the rotatable cylinder 34.

The light bulb 46 is electrically connected through two electrical conductors 49 and 50, their respective brushes 51 and 52, slip rings 26 and 27 and two electrical lines 30 through the cable 32 to the positive and negative terminals of a battery 63 and in series with a switch 64. The battery 63, by way of example, may be the conventional storage battery of an automobile. The positive terminal of the photosensitive transistor 45 is electrically connected through its electrical conductor 56, brush 58, slip ring 28 and conducting line 30 to the positive terminal of the battery 63 through the switch 64, and the negative terminal of the photosensitive transistor 45 is electrically connected through its conductor 57, brush 59, slip ring 29 and electrical conducting line 30 to the base terminal 65 of an amplifying transistor 66 of the n—p—n junction type and to the negative terminal of the battery 63 through an electrical resistor 67. The emitter terminal 68 of the amplifying transistor 66 is electrically connected to the negative terminal of the battery 63, and the collector terminal 69 of the transistor 66 is connected to one terminal 70 of the coil 71 of a normally open single pole single throw relay 72. The second terminal 73 of the coil 71 of the single pole single throw relay 72 is electrically connected to the positive terminal of the battery 63 through the switch 64. An audible and/or visible alarm 74 such as an electric bell or light has one of its terminals 75 wired to the negative terminal of the battery 63 and its other terminal 76 wired to the armature 77 of the relay 72; the normally open contact point 78 of the armature 77 of the relay 72 is electrically connected to the positive terminal of the battery 63 through the switch 64. The terminals 79 and 80 of the coil 81 of a second single pole single throw relay 82 are wired respectively to the negative terminal of the battery 63 through a normally open push button switch 83 and to the positive terminal of the battery 63 through the switch 64. The armature 84 of the second relay 82 is disposed approximately perpendicular to the armature 77 of the first said relay 72 with the ends of the two armatures 77 and 84 in mechanical contact, bearing alternately on one another so that when either relay is open the end of its armature holds the armature of the other relay closed.

The described circuit is not intended as a limitation in construction of the invention but is given as an examplary form of construction. To one skilled in the art it will be apparent that choice of electrical components has been governed to some extent by economic considerations, and it will be equally apparent that the amplifying transistor 66 can be eliminated from the circuit if the first said relay 72 is of an extremely sensitive type and that the mechanical coaction of the relays may be replaced by an electrically coactive system.

Figure 8:
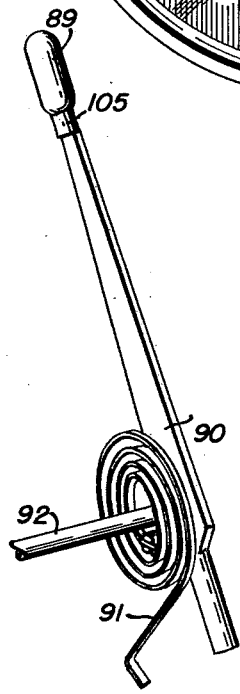
Figure 8 is an enlarged perspective view of a speedometer pointer arm as embodied in the illustrated alternate form of the invention.
Figure 9:
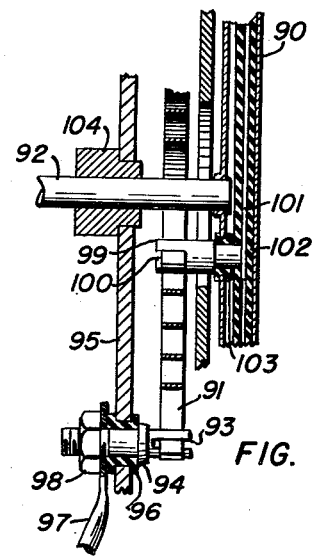
Figure 9 is an enlarged broken vertical sectional view of the electrical wiring arrangement of the pointer in the alternate form of the invention.

In an alternate form of the invention, as illustrated in Figures 6–9, the speedometer case 11, rotatable cylinder 34, mounting plate 43, and annular plate 24 are constructed as previously described. Two slip rings 85 and 86 corresponding in construction and function to the slip rings 28 and 29 are attached concentrically to the forward side of the annular plate 24. A photosensitive cell 87, identical to the cell 45, is attached to the forward side of the mounting plate 43 and is there aligned so that its photosensitive part is responsive only to light incident thereon along a radius defined by the radius of the slip rings 85 and 86. A pointer 88 integral with the mounting plate 43 projects inwardly of the translucent area 15 of the dial facing and is positioned forwardly of, but in alignment with, the line of incident sensitivity of the photosensitive cell 45. Electrical conductors 56 and 57 and brushes 58 and 59 connect the photosensitive cell to the electrical circuit as previously described. A light bulb 89 is attached to the tip of a speedometer arm 90, and which bulb is energized by means of employing the hairspring 91 of the speedometer as a conductor. As shown in Figure 8, the spring 91 is positioned around the pointer shaft 92; and as shown in Figure 9, the outer end of the spring 91 is received in a slot 93 of a metal stud 94 mounted in a bracket 95 within the speedometer. The stud 94 is insulated from the bracket 95 by means of a circular insulator 96, and the end of the stud 94 opposite the slot 93 is connected with a lead terminal 97 by means of a nut 98. The pointer 90 is of hollow metal construction and also has a projecting stud 99 in its rear surface and a slot 100 therein for receiving the inner end of the hairspring 91. The end of the stud 99 inside of the pointer 90 is in contact with a wire 101 extending to the light bulb 89. Insulation 102 is provided around the wire 101. Like the first described stud 94, the second stud 99 is provided with a circular insulator 103 therearound where it enters the pointer 90. The pointer shaft 92 is mounted in a bearing 104 which additionally serves as a conductor. Thus, current is supplied to the bulb 89 by way of the lead terminal 97, stud 94, spring 91, stud 99 on the pointer 90 and wire 101. The bulb 89 is grounded through its socket 105, pointer 90, pointer shaft 92, bearing 104 and bracket 95.

In operation, closing of the switch 64 turns on the light 44 and completes the circuits of the photosensitive transistor 45, the amplifying transistor 66, the relays 72 and 82, and the alarm 74. Rotation of the knob 42 turns the rotatable cylinder 34 within the case 11 and carries the photosensitive cell 45 to a position for actuation opposite the desired setting on the dial facing 14 as indicated thereon by the spot of light 62 (or by the light bulb 89 on the pointer 88 in the alternate form of the invention). When speed of the vehicle is increased or decreased to the point where light is incident upon the photosensitive cell 45 from the tip 23 of the longer portion 21 of the pointer arm 20, light activates the photosensitive cell 45 which is coupled to the base of the amplifying transistor 66. The resulting flow of current through the photosensitive cell 45 alters the electrical charge in the base of the amplifying transistor 66 and permits current to flow between the emitter and collector of the amplifying transistor 66 and thus through the coil 71 of the first said relay 72. Actuation of the first relay 72 completes the circuit of the alarm 74 through the armature 77 of the relay 72 and the contact point 78 of said armature; actuation of the first relay 72 also permits the end of the armature 84 of the second relay 82, urged by a spring 95, to move beneath the armature 77 of the first relay 72 and holds the armature 77 of the relay 72 in its closed position. Depression of the push button 83 actuates the second relay 82 which releases the armature 77 of the first relay 72 turning off the alarm 74, and the armature 84 of the second relay 82 is then held closed by the end of the armature 77 of the first relay 72.

With the master switch in its open position, the speedometer functions in the conventional manner without extraneous friction or any other impediment to normal operation.

The invention is not limited to the exemplary constructions herein shown and described, but may be made in various ways within the scope of the appended claims.

What is claimed is:

1. In combination with a speedometer including a case and having a movable pointer and calibrations arranged near the pointer tip, a speed warning device comprising a light emitter in said case mounted to move with said pointer, means in said case activating said light emitter, a photosensitive cell arranged to receive light from said emitter at a speed indicating position of said pointer relative to said calibrations, an electrical signal, and means electrically connecting said signal with said photosensitive cell.

2. A speed warning device as defined in claim 1, and including a movably mounted bracket in said case adjacent said calibrations and supporting said photosensitive cell thereon, said light emitter being mounted on said pointer.

3. A speed warning device as defined in claim 1, and wherein said light emitter in said case is a photoreflective surface, and wherein said means in said case energizing said emitter is a light bulb arranged to direct light to said surface.

4. A speed warning device as defined in claim 1, and wherein said light emitter is a light bulb mounted on said pointer.

5. A speed warning device as defined in claim 2, and wherein said bracket in said case is mounted on a rotatable ring, and wherein said pointer is mounted on a shaft, said rotatable ring being concentrically positioned around the axis of said shaft.

6. A speed warning device as defined in claim 1 and wherein said light emitter in said case is a photoreflective surface, and a movably mounted bracket in said case adjacent said calibrations, said photosensitive cell and said means activating said emitter both being mounted on said bracket.

References Cited in the file of this patent

UNITED STATES PATENTS

| | | |
|---|---|---|
| 2,329,715 | Grier | Sept. 21, 1943 |
| 2,337,535 | Acs, Jr. | Dec. 28, 1943 |
| 2,464,191 | Wen | Mar. 8, 1949 |